United States Patent [19]

Baumann et al.

[11] 3,894,012

[45] July 8, 1975

[54] PRODUCTION OF OXAZINE DYE

[75] Inventors: Hans Baumann, Ludwigshafen; Udo Mayer, Frankenthal, both of Germany

[73] Assignee: Badische Anilin- & Soda-Fabrik Aktiengesellschaft, Ludwigshafen (Rhine), Germany

[22] Filed: Feb. 7, 1973

[21] Appl. No.: 330,253

[30] Foreign Application Priority Data
Feb. 11, 1972 Germany............................ 2206508

[52] U.S. Cl............................. 260/244 R; 260/242
[51] Int. Cl............................................ C09b 19/00
[58] Field of Search............................ 260/244, 242

[56] References Cited
UNITED STATES PATENTS

| | | | |
|---|---|---|---|
| 3,629,248 | 12/1971 | Schafer et al. | 260/244 |
| 3,655,601 | 4/1972 | Ottawa et al. | 260/244 |

*Primary Examiner*—Harry I. Moatz
*Attorney, Agent, or Firm*—Johnston, Keil, Thompson & Shurtleff

[57] ABSTRACT

An improved process for the production of oxazine dyes by condensation of a meta-aminophenol and a 3-alkoxy-4-nitroso-N-substituted aniline comprising the addition of a Lewis acid and a base in the condensation step.

2 Claims, No Drawings

PRODUCTION OF OXAZINE DYE

The invention relates to a process for the production of dyes of the formula (I):

$$\left[ R^1\text{-}N(R^2)\text{-}C_6H_3(R)\text{-}N=C_6H_3\text{-}O\text{-}...\text{-}N(R^3)(R^4) \right]^{(+)} A^{(-)} \quad (I)$$

in which
R is hydrogen or alkyl;
$R^1$ is hydrogen, unsubstituted or substituted alkyl, cycloalkyl or aralkyl;
$R^2$ is hydrogen or unsubstituted or substituted alkyl;
$R^3$ is unsubstituted or substituted alkyl, cycloalkyl, aralkyl or phenyl;
$R^4$ is hydrogen or unsubstituted or substituted alkyl; and
$A^{(-)}$ is an anion from a compound of the formula (II):

$$R^1\text{-}N(R^2)\text{-}C_6H_3(R)\text{-}OH \quad (II)$$

and a compound of the formula (III):

$$ON\text{-}C_6H_3(OR^5)\text{-}N(R^3)(R^4) \quad (III)$$

by condensation, $R^5$ being alkyl of one to four carbon atoms and R to $R^4$ having the meanings given above, wherein the condensation is carried out in the presence of a Lewis acid, preferably of a metal, and in the presence of a base.

In addition to hydrogen, the following are examples of specific radicals:
for R: ethyl, n-propyl, isopropyl, n-butyl, isobutyl and preferably methyl;
for $R^3$: methyl, ethyl, n-propyl, isopropyl, n-butyl, isobutyl, cyclohexyl, benzyl, phenylethyl, phenyl, β-hydroxyethyl, β-hydroxypropyl, γ-hydroxypropyl, β,γ-dihydroxypropyl, β-cyanoethyl, β-carbomethoxyethyl, β-carboethoxyethyl, methylphenyl, chlorophenyl or methoxyphenyl;
for $R^2$: unsubstituted or substituted alkyl as in $R^3$;
for $R^1$: radicals $R^3$ other than unsubstituted or substituted phenyl;
for $R^4$: unsubstituted or substituted alkyl as in $R^3$;
for $R^5$: propyl, butyl and preferably methyl and ethyl.

Examples of anions $A^{(-)}$ are chloride, bromide, sulfate, nitrate, methosulfate, ethosulfate, formate, acetate, oxalate, toluenesulfonate, phosphate and tetrachlorozincate.

The anion may be freely chosen because it has no effect on the properties of the dyeing. In view of the use of the dye in the dye liquor however the anion is advantageously chosen so that it gives high solubility.

Examples of Lewis acids of metals are aluminum, titanium, iron, tin, manganese, copper and particularly zinc salts and the halides are preferred. The use of other salts, for example the acetates, is also possible. Boron fluoride etherates are also suitable Lewis acids.

Examples of bases which may be added in the condensation are amines, metal oxides or metal carbonates, e.g., diethanolamine, piperidine, triisopropanolamine, triisopropylamine, quinoline, picoline, pyridine, sodium carbonate, sodium bicarbonate, potassium carbonate, calcium carbonate, magnesium carbonate, magnesium oxide, aluminum hydroxide and preferably basic zinc salts such as zinc oxide, basic zinc carbonate and also zinc acetate, the latter acting simultaneously as a Lewis acid and as a base.

The reaction according to the invention is advantageously carried out by adding a Lewis acid and a base to a compound of the formula (II), for example in solution in an alcohol or glycol (for example in methanol, ethanol, n-propanol, isopropanol, butanol, glycol, diethylene glycol, ethylene glycol monomethyl, monoethyl or monobutyl ether or diethylene glycol monomethyl ether) and gradually adding a compound of the formula (III) in the form of a salt, preferably the hydrochloride. The oxazine compound of formula (I) which forms is precipitated as a salt during the reaction. It is extremely pure, is formed in a high yield and can be isolated by simple suction filtration. The oxazine compound usually occurring as a salt with the complex anion containing the Lewis acid may be converted into salts with other anions for example via the base.

Other details concerning the production of the oxazine compounds of the formula (I) may be seen from the Examples.

The new process is of special importance for the production of compounds of the formula (Ia):

$$\left[ X^1\text{-}X^2\text{-}N\text{-}C_6H_2(X^3)\text{-}O\text{-}C_6H_2\text{-}N\text{=}...\text{-}N(X^4)\text{-}C_6H_4\text{-}X^5 \right]^{(+)} A^{(-)} \quad (Ia)$$

in which
$X^1$ is hydrogen or alkyl of one to four carbon atoms;
$X^2$ is hydrogen, alkyl of one to four carbon atoms, β-hydroxyethyl, β-chloroethyl, β-cyanoethyl or hydroxypropyl;
$X^3$ is hydrogen, methyl or ethyl;
$X^3$ is hydrogen, methyl or ethyl;
$X^4$ is hydrogen, methyl, ethyl, β-cyanoethyl or β-hydroxyethyl; and
$X^5$ is hydrogen, methyl, ethyl, methoxy or ethoxy; and
$A^{(-)}$ has the meanings given above.
$X^4$ is preferably hydrogen and $X^3$ is preferably hydrogen or methyl.

The method of the invention offers great advantages over the method disclosed in German Laid-Open Specification No. 2,030,028 for the production of oxazine dyes. The prior art method gives only very contaminated products which cannot be freed from impurities at reasonable expense and consequently do not give reproducible dyeings.

As a result of the measures of the invention the dyes are surprisingly precipitated in a pure, easily filterable form during the reaction, the impurities remaining in solution. After the dyes have been isolated and if desired subjected to an exchange of anion, the dyes may be used immediately for dyeing and because of their high purity bright blue dyeings are obtained in an absolutely reproducible manner, particularly on anionically modified fibers such as acrylonitrile polymers and polyesters.

The following Examples illustrate the invention. Statements of parts and percentages in the following Examples are by weight unless otherwise stated.

EXAMPLE 1

26 g of p-nitroso-N-diethyl-m-phenetidine hydrochloride is introduced over an hour into a mixture of 17 g of m-diethylaminophenol, 20 g of zinc chloride, 4 g of zinc oxide and 100 ml of methyl glycol which has been heated to 80°C. The whole is kept at 80°C for another 2 hours and then the dye salt which has been precipitated is suction filtered. It weighs 38 g and gives bright blue dyeings on polyacrylonitrile fibers.

Under the same reaction conditions 35 g or 30 g of the corresponding dye salts are obtained from 26 g of p-nitroso-N-diethyl-m-phenetidine hydrochloride and 15 g of 3-ethylamino-4-methylphenol or 13 g of 3-amino-4-methylphenol; the dye salts can easily be suction filtered and are of high purity.

EXAMPLE 2

27 g of 3-methoxy-4-nitrosodiphenylammonium chloride is introduced in two hours into a mixture of 17 g of m-diethylaminophenol, 20 g of zinc chloride, 2 g of magnesium oxide and 100 ml of methyl glycol which is at 60°C. After another two hours at 60°C the mixture is filtered at the said temperature. The crystals deposited during the reaction weigh 43 g. They dye polyacrylonitrile fibers bright blue shades.

EXAMPLE 3

28 g of 3-methoxy-4-nitrosophenyl-o-tolylammonium chloride is introduced slowly into a solution, at 50°C, of 17 g of m-diethylaminophenol, 14 g of zinc chloride, and 16 g of pyridine in 100 ml of isobutanol. The crystals deposited are suction filtered after three hours. They weigh 46 g and dye polyacrylonitrile fibers bright blue shades of outstanding fastness properties. The dye is eminently suitable for combination dyeing because of its neutral blue shade.

Similar results are obtained by using sodium bicarbonate, zinc acetate, diethanolamine or triisopropylamine instead of pyridine.

EXAMPLE 4

28 g of 3-methoxy-4-nitrosophenyl-p-tolylammonium chloride is introduced during two hours into a mixture of 15 g of 3-ethylamino-4-methylphenol, 24 g of ferric chloride, 4 g of zinc oxide and 150 ml of ethanol which is at 80°C. 47 g of the corresponding oxazine dye crystallizes out in high purity.

Similar results are obtained when zinc chloride, tin chloride or aluminum chloride is used instead of ferric chloride.

The dyes identified by specifying their substituents in the following Table are obtained in a manner analogous to the method described above:

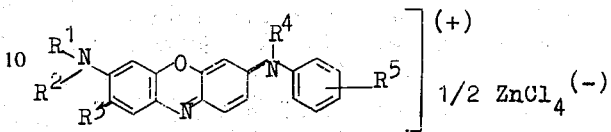

| Ex. | R¹ | R² | R³ | R⁴ | R⁵ |
|-----|------|----------|-----|--------|---------|
| 5 | CH₃ | CH₃ | H | H | p—OC₂H₅ |
| 6 | H | C₂H₄CN | CH₃ | H | p—CH₃ |
| 7 | H | C₂H₄OH | H | H | H |
| 8 | C₂H₅ | C₂H₅ | H | H | p—OCH₃ |
| 9 | C₂H₅ | C₂H₅ | H | C₂H₅ | H |
| 10 | CH₃ | CH₃ | H | CH₃ | H |
| 11 | C₂H₅ | C₂H₅ | H | C₂H₄OH | H |
| 12 | H | C₂H₅ | CH₃ | H | p—CH₃ |
| 13 | H | C₂H₅ | CH₃ | H | p—CH₃ |

We claim:

1. In the process for the production of an oxazine dye of the formula (I):

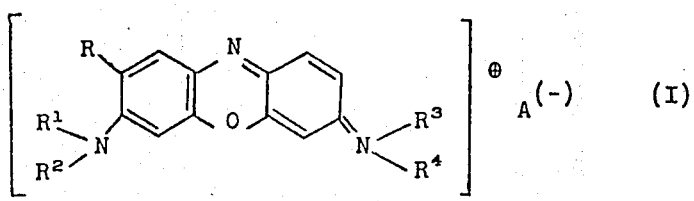

R is hydrogen or alkyl;
R¹ is hydrogen, unsubstituted or substituted alkyl, cycloalkyl or aralkyl;
R² is hydrogen or unsubstituted or substituted alkyl;
R³ is unsubstituted or substituted alkyl, cycloalkyl, aralkyl or phenyl;
R⁴ is hydrogen or unsubstituted or substituted alkyl; and
A⁽⁻⁾ is an anion,
by condensation at an elevated temperature in an alcoholic or glycolic solution of a compound of the formula

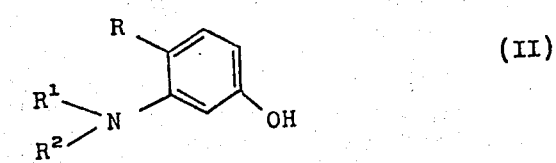

and a compound of the formula

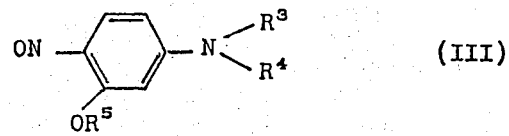

where R⁵ is alkyl of one to four carbon atoms and R to R⁴ have the meanings given above, the improvement which comprises carrying out the condensation in the presence of both a zinc salt as a Lewis acid and a basic zinc compound as a base.

2. A process as claimed in claim 1 wherein the Lewis acid is zinc chloride.

* * * * *